United States Patent [19]

Kikuchi et al.

[11] Patent Number: 4,855,710
[45] Date of Patent: Aug. 8, 1989

[54] BURGLARPROOF SYSTEM FOR AUTOMOTIVE VEHICLES

[75] Inventors: Hideya Kikuchi; Hiroshi Ikeuchi, both of Higashimatsuyama, Japan

[73] Assignee: Diesel Kiki Co., Ltd., Tokyo, Japan

[21] Appl. No.: 214,957

[22] Filed: Jul. 5, 1988

[30] Foreign Application Priority Data

Jul. 9, 1987 [JP] Japan .................................. 62-169660
Aug. 26, 1987 [JP] Japan .................................. 62-210342

[51] Int. Cl.$^4$ ........................ B60R 25/00; E05B 9/10
[52] U.S. Cl. .................................... 340/426; 340/429;
340/542; 307/10.3; 180/173; 180/287;
200/61.64; 70/416; 70/379 R; 70/DIG. 49;
70/DIG. 51
[58] Field of Search .................................. 340/63–65,
340/541, 542, 825.31, 825.32; 307/10 R, 10 AT;
180/173, 287; 70/416–419, 449, DIG. 2, DIG.
21, DIG. 38, DIG. 49, DIG. 51, 388, 379 R;
200/61.64

[56] References Cited

U.S. PATENT DOCUMENTS

| 3,936,673 | 2/1976 | Kelly et al. | 340/63 |
| 4,035,791 | 7/1977 | Katayama | 340/63 |
| 4,225,008 | 9/1980 | Colell et al. | 307/10 AT |
| 4,635,035 | 1/1987 | Ratzabi | 307/10 AT |

Primary Examiner—Donnie L. Crosland

[57] ABSTRACT

In a burglarproof system for an automotive vehicle, a door key cylinder arranged at a vehicle door includes a cylindrical body and a rotor accommodated therein. An acting section provided at the rotor extends radially from an axis thereof. A door key switch arranged in the vicinity of the door key cylinder detects the acting section to output a key-operation detection signal, when the rotor is angularly moved by turning operation of a key to bring a door locking mechanism to an unlocked position. A door lock switch detects in which one of the locked and unlocked positions the locking mechanism is. A stealing detector is provided for outputting a stealing detection signal when the stealing detector does not receive the key-operation detection signal from the door key switch, but receives the lock-releasing detection signal from the door lock switch. A burglarproof unit executes operation for a burglarproof in response to the stealing detection signal.

8 Claims, 7 Drawing Sheets

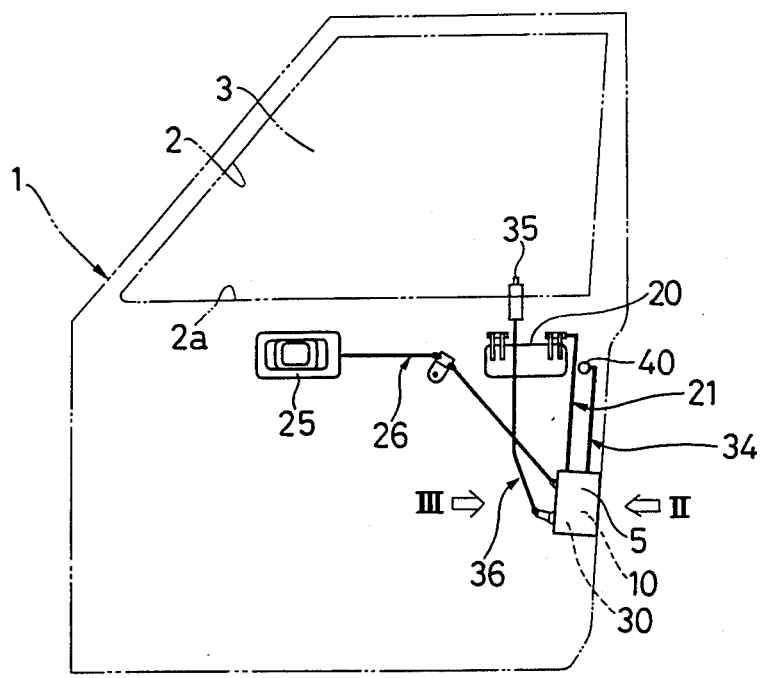
Fig.1
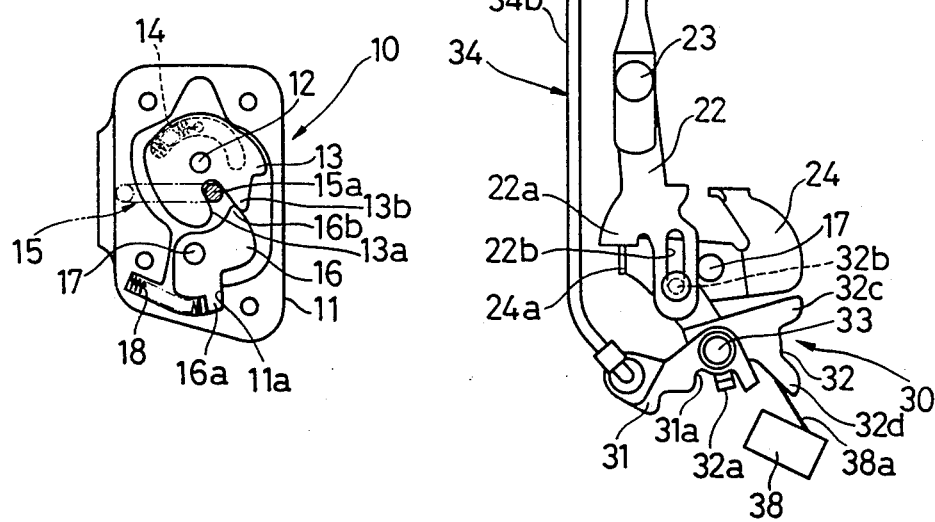
Fig.2
Fig.3

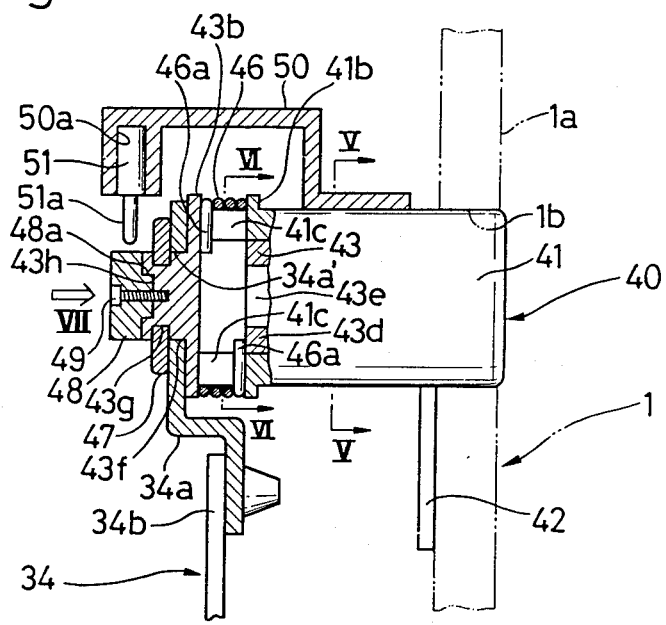
Fig. 4
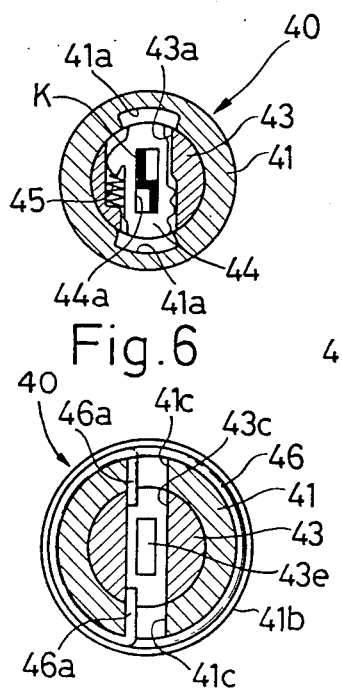
Fig. 5
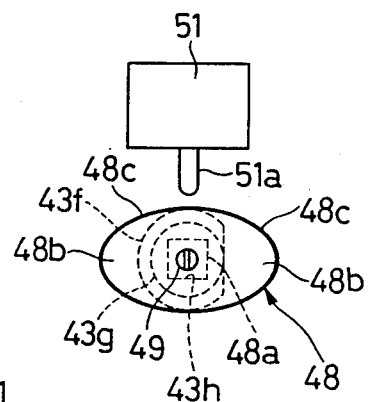
Fig. 7a
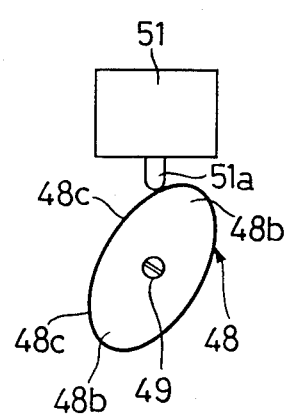
Fig. 7b
Fig. 6

BURGLARPROOF SYSTEM FOR AUTOMOTIVE VEHICLES

BACKGROUND OF THE INVENTION

The present invention relates to a burglarproof system applied to doors of automotive vehicles.

Each door of an automotive vehicle is provided with a latching mechanism for maintaining the door closed. The latching mechanism is brought to an unlatched state by unlatching operating means such as a door handle or the like, to permit the door to be opened. Moreover, the door is provided with a locking mechanism associated with the latching mechanism, for preventing various equipments within the automotive vehicle and the automotive vehicle per se from being stolen. The locking mechanism is also associated with a door key cylinder, and is movable between a locked position and an unlocked position by turning of a key inserted into the door key cylinder. In the locked position, the locking mechanism prohibits operating force acting on the door handle from being transmitted to the latching mechanism, whereby the door cannot be opened. In the unlocked position, the operating force acting on the door handle is transmitted to the latching mechanism, so that the door can be opened.

However, even if the door is provided with the locking mechanism, a habitual thief can bring the locking mechanism to the unlocked position without relying upon operation of the key. That is, the habitual thief forms a bore in a part of the window glass, and operates a lock button arranged at the door and located adjacent a lower edge of the window on the inside of the vehicle, whereby the habitual thief can bring the locking mechanism to the unlocked position. Alternatively, a thin and elongated element is inserted through a slit formed between the window frame of the door and an edge of the window glass slidable within the window frame, and the locking mechanism can be brought to the unlocked position by the forward end of the thin and elongated element In view of the above circumstances, a burglarproof system has been developed, as disclosed in Japanese Patent Application Laid-Open No. 61-71252, which comprises a door key switch for detecting insertion of a key with into a door key cylinder, a door lock switch for detecting in which one of locked and unlocked positions a locking mechanism is, and a stealing detection circuit. Judgment by the stealing detection circuit indicates stealing, when the stealing detecting circuit does not receive a key-insertion detection signal from the door key switch, but receives an unlocking detection signal from the door lock switch, whereby the stealing detection circuit outputs a stealing detection signal. In response to the stealing detection signal, the horn is sounded, or the engine start-up is prohibited, thereby preventing stealing.

By the way, a regular driver of the automotive vehicle inserts the key into the door key cylinder and turns the key, thereby bringing the locking mechanism to the unlocked position. At this time, the stealing detection circuit receives the unlocking detecting signal from the door lock switch, and also receives the key-insertion detection signal from the door key switch, so that the stealing detection circuit does not output the stealing detection signal.

With the system disclosed in the Japanese patent, however, the door key switch is arranged adjacent the innermost end of the key cylinder remote from the key insertion opening, and the forward end of the key inserted pushes the door key switch, thereby obtaining the key-insertion detection signal. Because of such arrangement, mere insertion of an elongated element, in place of the key, into the door key cylinder by a thief enables the key-insertion detection signal to be issued. Even if the locking mechanism is unlocked after the issuance of the key-insertion detection signal, the stealing detection circuit does not output the stealing detection signal. Thus, it has been impossible to secure prevention of stealing.

SUMMARY OF THE INVENTION

It is an object of the invention to provide a burglarproof system for automotive vehicles, capable of securing prevention of stealing.

According to the invention there is provided a burglarproof system for an automotive vehicle, comprising:

(a) latching means for maintaining a door of the automotive vehicle closed with respect to a body of the automotive vehicle;

(b) unlatching operating means for bringing the latching means to an unlatched state;

(c) locking means movable between a locked position where the locking means prohibits transmission of a force from the unlatching operating means to the latching means to maintain the door closed and an unlocked position where the locking means permits the force to be transmitted from the unlatching means to the latching means;

(d) a door key cylinder arranged at the door, the door key cylinder including:
  (i) a cylindrical body;
  (ii) a rotor accommodating in the cylindrical body, the rotor being operatively connected to the locking means and angularly movable about its own axis between a first angular movement position bringing the locking means to the locked position and a second angular movement position bringing the locking means to the unlocked position;
  (iii) tumbler means accommodated in the cylindrical body and movable between a first position where the tumbler means prohibits angular movement of the rotor relative to the cylindrical body and a second position where the tumbler means permits angular movement of the rotor relative to the cylindrical body, the tumbler means being moved from the first position to the second position when the key is inserted into the rotor; and
  (iv) an acting section provided at the rotor and extending radially from an axis of the rotor, (e) a door key switch arranged in the vicinity of the door key cylinder, the door key switch detecting the acting section of the rotor to output a key-operation detection signal when the rotor of the door key cylinder is angularly moved about its own axis by turning operation of the key;

(f) a door lock switch for detecting in which one of the locked position and the unlocked position the locking means is;

(g) stealing detection means for outputting a stealing detection signal when the stealing detection means does not receive the key-operation detection signal from the door key switch, but receives a lock-releasing detection signal from the door lock switch;

(h) burglarproof means for executing operation for a burglarproof in response to the stealing detection signal from the stealing detection means.

BRIEF DESCRIPTION OF THE DRAWINGS

FIG. 1 is a diagrammatic view of a burglarproof system for automotive vehicles according to an embodiment of the invention, the burglarproof system being seen from the inside of a door;

FIG. 2 is an enlarged view of a latching mechanism as viewed from the arrow II in FIG. 1;

FIG. 3 is an enlarged view of a locking mechanism as viewed from the arrow III in FIG. 1;

FIG. 4 is a partially cross-sectional, side elevational view showing a door key cylinder and a door key switch incorporated in the burglarproof system illustrated in FIG. 1;

FIG. 5 is a cross-sectional view taken along the line V—V in FIG. 4, showing the door key cylinder;

FIG. 6 is a cross-sectional view taken along the line VI—VI in FIG. 4, showing the door key cylinder;

FIGS. 7a and 7b are views of the door key cylinder and the door key switch as viewed from the arrow VII in FIG. 4, respectively showing positions of the door key cylinder different from each other;

FIG. 10 is a flow chart of a program executed by a microcomputer when a power source is turned on;

DETAILED DESCRIPTION

Figure 8:
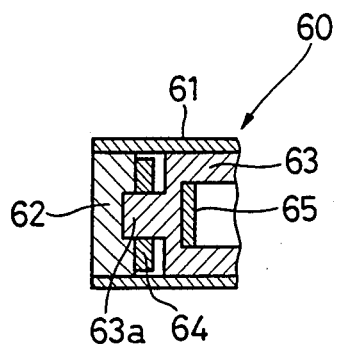
FIG. 8 is a fragmental cross-sectional view of an ignition key cylinder arranged at the automotive vehicle to which the burglarproof system is applied.

Embodiments of a burglarproof system according to the invention will be described with reference to the accompanying drawings.

An outline of the entire mechanical arrangement of the burglarproof system will first be described with reference to FIGS. 1 through 3. FIG. 1 shows a door 1 whose left side edge as viewed in FIG. 1 is pivotally connected to a body of an automotive vehicle through a hinge arrangement (not shown). The door 1 is formed at its upper portion with a window 2 which can be opened and closed by a glass plate 3 movable substantially vertically.

The door 1 is provided with a box 5 in which a latching mechanism 10 is accommodated for maintaining the door 1 closed.

As shown in FIG. 2, the latching mechanism 10 comprises a base plate 11, and an engaging member 13 mounted to the base plate 11 for angular movement about an axis of a pin 12. The engaging member 13 is biased by a coiled compression spring 14 in a clockwise direction about the axis of the pin 12 as viewed in FIG. 2. The engaging member 13 is formed with a recess 13a which is directed toward the left as viewed in FIG. 2 when the door 1 is opened. In the course of closure of the door 1, the engaging member 13 moves to the left as viewed in FIG. 2 toward a U-shaped striker 15 mounted to the vehicle body, and the recess 13a is brought into engagement with one of a pair of legs 15a of the striker 15. As the door 1 further moves, the engaging member 13 is urged by the striker 15 and is angularly moved in the counterclockwise direction about the axis of the pin 12 against the biasing force of the coiled spring 14, so that the engaging member 13 reaches a position shown in FIG. 2. The latching mechanism 10 further comprises a latching lever 16. The latching lever 16 is fixedly mounted to one end of a pin 17 which extends through the base plate 11 such that the pin 17 is angularly movable about its own axis relatively to the base plate 11. The latching lever 16 is biased in the counterclockwise direction as viewed in FIG. 2 about the axis of the pin 17 by a coiled compression spring 18. The latching lever 16 has a pair of pawls 16a and 16b, and is normally maintained in such a posture that one pawl 16a is in abutment against a stepped portion 11a of the base plate 11 under the biasing force of the coiled spring 18.

During angular movement of the engaging member 13 about the axis of the pin 12 in the counterclockwise direction as described above, a pawl 13b formed on the engaging member 13 at a location adjacent the recess 13a is abutted against the other pawl 16b of the latching lever 16, and angularly moves the latching lever 16 temporarily in the clockwise direction about the axis of the pin 17 against the biasing force of the coiled spring 18. At this time, the pawl 13b climbs over the pawl 16b. As a result, as shown in FIG. 2, the pawls 13b and 16b are latched to each other, so that the latching mechanism 10 is brought to the latched position, thereby maintaining the door 1 closed.

The latching mechanism 10 can be released from the latched state by angular movement operation of either one of an outside door handle 20 and an inside door handle 25.

An upper end of a link mechanism 21 is operatively connected to the outside door handle 20. The link mechanism 21 has a lower end to which an upper end of a vertically movable link 22 is pivotally connected through a pin 23 as shown in FIG. 3. On the other hand, an unlatching lever 24 is operatively connected to the latching lever 16. For example, the unlatching lever 24 is fixedly mounted to the other end of the pin 17 having the one end to which the latching lever 16 is fixedly mounted.

When the outside door handle 20 is angularly moved, the vertically movable link 22 is moved downwardly to cause its acting section 22a to push a pawl 24a of the unlatching lever 24 down. As the pawl 24a is pushed down, the unlatching lever 24 is angularly moved about the axis of the pin 17 in the counterclockwise direction as viewed in FIG. 3 and, at the same time, the latching lever 16 is angularly moved in the same direction (in the clockwise direction as viewed in FIG. 2) about the axis of the pin 17 against the biasing force of the coiled spring 18. As a result, latching between the pawl 16b of the latching lever 16 and the pawl 13b of the engaging member 13 is released, so that the latching mechanism 10 is brought to the unlatched position, thereby enabling the door 1 to be moved toward its open position. Additionally, the vertically movable link 22 is returned to its initial position by biasing means (not shown) when the driver releases or loosen his hand from the outside door handle 20.

The inside door handle 25 is operatively connected to one end of a link mechanism 26 whose other end is operatively connected to a lever (not shown). A forward end of the lever is abutted against a lower surface of a right-hand end portion of the unlatching lever 24 as viewed in FIG. 3. When the inside door handle 25 is operated to be angularly moved, the lever angularly moves the unlatching lever 24 through the link mechanism 26 in the counterclockwise direction, whereby the latching mechanism 10 is released from the latched position in a manner like that described above.

The latching mechanism 10 is maintained at the latched position by a locking mechanism 30. The locking mechanism 30 is provided with a pair of first and second levers 31 and 32 which are mounted to the base plate 11 through a common pin 33 for angular movement about an axis thereof. The first lever 31 is formed in its lower edge with a recess 31a, while the second lever 32 is formed in its lower edge with a projection 32a arranged within the recess 31a. A pin 32b is mounted to an upper end of the second lever 32, and is fitted into a vertically extending slot 22b formed in a lower portion of the vertically movable link 22, for sliding movement along the slot 22b.

When the first lever 31 is angularly moved in the clockwise direction about the axis of the pin 33, the right-hand side edge of the recess 31a in the first lever 31 pushes the projection 32a of the second lever 32, so that the second lever 32 is angularly moved in the same direction about the axis of the pin 32b. This causes the pin 32b of the second lever 32 to be moved in the right-hand direction as viewed in FIG. 3, so that the vertically movable link 22 is pivotally moved in the counterclockwise direction about the axis of the pin 23. As a result, the acting section 22a of the vertically movable link 22 is displaced toward the right from the position corresponding to the pawl 24a of the unlatching lever 24. In this state, the angular movement operational force acting upon the outside door handle 20 is transmitted to the vertically movable link 22, but is not transmitted to the unlatching lever 24. Thus, the latching mechanism 10 is maintained at the latched position. The state or position of the locking mechanism 30 at this time is referred to as "locked state" or "locked position".

When the first lever 31 is angularly moved in the counterclockwise direction about the axis of the pin 33, the left-hand side edge of the recess 31a pushes the projection 32a of the second lever 32, whereby the second lever 32 is angularly moved in the same direction about the axis of the pin 33. As a result, the acting section 22a of the vertically movable link 22 moves in the left-hand direction, and is returned to the position corresponding to the pawl 24a of the unlatching lever 24. In this state or position, the angular movement operational force acting upon the outside door handle 20 can be transmitted to the latching mechanism 10, making it possible to release the latching mechanism 10 from the latched position. The state or position of the locking mechanism 30 at this time is referred to as "unlocked state" or "unlocked position".

Further, the second lever 32 prohibits the angular movement of the inside door handle 25 from being transmitted to the unlatching lever 24 in the locked position, but permits the angular movement of the inside door handle 25 to be transmitted to the unlatching lever 24 in the unlocked position. A mechanism for this purpose is known, and the description of the mechanism will be omitted.

A link mechanism 34 has a lower end which is pivotally connected to the left-hand end of the first lever 31 of the locking mechanism 30. An upper end of the link mechanism 34 is connected to a door key cylinder 40 subsequently to be described. Although described later in detail, turning operation of the key relative to the door key cylinder 40 causes the first lever 31 to be angularly moved about the axis of the pin 33 through the link mechanism 34, so that the locking mechanism 30 can move between the locked and unlocked positions.

Moreover, a lock button 35 is arranged in the vicinity of a lower side edge 2a of the window 2 on the vehicle compartment side of the door 1. The lock button 35 is operatively connected to an arm section 32c of the second lever 32 through the link mechanism 36 and a link mechanism (not shown) within the box 5. When the lock button 35 is pushed down, the second lever 32 is brought to the locked position, while when the lock button 35 is pulled up, the second lever 32 is brought to the unlocked position.

An actuator lever 38a of a door lock switch 38 is in contact with another arm section 32d of the second lever 32. The arrangement is such that when the second lever 32 is in the locked position, the door lock switch 38 is turned on, while when the second lever 32 is in the unlocked position, the door lock switch 38 is turned off.

The door key cylinder 40 provided with the important feature of this invention will be described with reference to FIGS. 4 through 7b. As shown in FIG. 4, the door key cylinder 40 is mounted to an outer panel section 1a of the door 1. The door key cylinder 40 has a cylindrical body 41. A bracket 42 is integrally formed at one end of the body 41. The bracket 42 is fixedly mounted to the inner surface of the outer panel section 1a of the door 1, to support the body 41. The body 41 extends through a bore 1b formed in the outer panel section 1a, and is exposed to the outside. A key insertion opening (not shown) is provide in the exposed end wall of the body 41.

The door key cylinder 40 further has a hollow cylindrical rotor 43 accommodated in the body 41. As shown in FIG. 5, a plurality of radially extending bores 43a are formed in the rotor 43 and are spaced from each other along the longitudinal axis of the rotor 43. A plurality of elongated plate tumblers 44 are accommodated respectively in the bores 43a for radial movement in parallel relation to each other. Each plate tumbler 44 is biased longitudinally thereof by a corresponding one of coil springs 45 accommodated respectively in the bores 43a. Thus, one end of the plate tumbler 44 is fitted into either one of a pair of grooves 41a and 41a formed in the inner peripheral wall surface of the body 41 in parallel relation to the longitudinal axis of the body 41. Thus, the rotor 43 is restricted with respect to the body 41 against angular movement about the longitudinal axis of the rotor 43 relative to the body 41.

Each plate tumbler 44 is formed with a bore 44a. The key K is inserted through the key insertion opening provided in the body 41, and passes through the bores 44a in the respective plate tumblers 44. In the course of passage of the key K through the bores 44a, each plate tumbler 44 is moved radially by the key K so that the end of the plate tumbler 44 is moved away from the groove 41a in the body 41. As a result, the rotor 43 is released from the restraint with respect to the body 41, and is made angularly movable about the longitudinal axis of the rotor 43.

The body 41 is formed with a flange 41b. As shown in FIG. 6, a pair of slits 41c and 41c are formed respectively at upper and lower sections of a portion of the body 41 closer to the innermost end thereof than the flange 41b. On the other hand, the rotor 43 is also formed with a flange 43b. A vertically extending slit 43c is formed in a portion of the rotor 43 adjacent an end face of the flange 43b on the side of the key insertion opening. A coiled return spring 46 is arranged between the flange 41b of the body 41 and the flange 43b of the rotor 43. The return spring 46 has both end portions 46a and 46a which are bent inwardly. Normally, the bent end portions 46a and 46a are abutted respectively against the side faces of the respective slits 41c and 43c. The rotor 43 is angularly movable about its longitudinal axis in the clockwise and counterclockwise directions as viewed in FIG. 6, but is biased by the coil spring 46 so as to be returned to the initial position shown in FIG. 6.

The rotor 43 is formed with a partition wall 43d at a location closer to the key insertion opening than the slit 43c. The partition wall 43d is formed with a bore 43e. The forward end of the key K passes through the bore 43e and faces the slit 43c.

The innermost end of the rotor 43 is provided with a connecting section 43f having its cross-sectional shape like a configuration in which a portion is cut out from a circle. A first link 34a of the link mechanism 34 has one end connected to the connecting section 43f against angular movement relative thereto. That is, a bore 34a' corresponding to the connecting section 43f is formed in the one end of the first link 34a, and the connecting section 43f is fitted into the bore 34a'. The connecting section 43f is formed with an annular groove 43g. A snap ring 47 is fitted into the annular groove 43g, to prevent the first link 34a from coming out of the connecting section 43f.

A second link 34b of the link mechanism 34 has an upper end which is pivotally connected to the other end of the first link 34a. A lower end of the second link 34b is pivotally connected to the first lever 31 of the aforementioned locking mechanism 30. As a result, the rotor 43 is operatively connected to the locking mechanism 30 in such a manner that when the rotor 43 is angularly moved about its own axis in one direction, for example, in the clockwise direction as viewed in FIGS. 5 and 6, the second link 34b is pulled up, so that the first lever 31 of the locking mechanism 30 is angularly moved about the axis of the pin 33 in the clockwise direction as viewed in FIG. 3, thereby bringing the locking mechanism 30 to the locked position. On the other hand, when the rotor 43 is angularly moved about its own axis in the counterclockwise direction as viewed in FIGS. 5 and 6, the second link 34b is pushed down, so that the first lever 31 of the locking mechanism 30 is angularly moved about the axis of the pin 33 thereby bringing the locking mechanism 30 to the unlocked position.

An acting member 48 is fixedly mounted to the rotor 43 at a location forwardly of the connecting section 43f thereof. Specifically, a rectangular recess 43h is formed in the end face of the connecting section 43f. A rectangular projection 48a corresponding to the recess 43h is formed on the end face of the acting member 48. The acting member 48 is fixed to the connecting section 43f by means of a screw 49, with the projection 48a fitted into the recess 43h. The acting member 48 is formed into an elliptical configuration as shown in FIGS. 7a and 7b. The acting member 48 is provided with a pair of acting sections 48b and 48b extending radially from the axis of the rotor 48. The upper side face of the acting member 48 extending between the pair of acting sections 48b and 48b is formed into a pair of cam faces 48c and 48c.

A bracket 50 has one end thereof which is fixedly mounted to the upper position of the peripheral surface of the body 41 of the door key cylinder 40. The bracket 50 extends axially of the body 41, and an accommodating section 50a opening downwardly is formed at the other end of the bracket 50. A door key switch 51 for detecting angular movement of the rotor 43, in other words, for detecting turning movement of the key K is fixedly accommodated in the accommodating section 50a. The door key switch 51 is arranged just above the acting member 48, and an actuator pin 51a of the door key switch 51 projects downwardly toward the center of the acting member 48.

In a state in which the key K is not turned relatively to the door key cylinder 40, the acting member 48 of the rotor 43 is located to extend horizontally as shown in FIG. 7a. In this state, the actuator pin 51a of the door key switch 51 projects downwardly to the maximum, so that the door key switch 51 is turned off.

When the key K is inserted into the deepest section of the key cylinder 40, the rotor 43 is released from the restraint with respect to the body 41 as described above, so that the rotor 43 is made angularly movable about its own axis. However, mere insertion of the key K into the key cylinder 40 does not allow the door key switch 51 to be operated so that the door key switch 51 is maintained turned off.

When the key K is subsequently turned, the rotor 43 is angularly moved about its own axis in the same direction, so that the locking mechanism 30 is brought to the unlocked position from the locked position, or is brought to the locked position from the unlocked position. In the course of angular movement of the rotor 43 about its own axis, one of the cam faces 48c of the acting member 48 pushes the actuator pin 51a of the door key switch 51 up so that the door key switch 51 is turned on. This "ON" signal serves as a key operation detection signal.

As the driver's hand is released from the key K after the key K is turned to release locking of the door in the manner as described above, the rotor 43 is angularly moved about its own axis in the reverse direction under the biasing force of the coiled spring 46 and is returned to the initial position. At the same time, the acting member 48 is also returned to the position shown in FIG. 7a. In the course of return movement of the acting member 48, the door key switch 51 is switched from the "ON" position to the "OFF" position.

Figure 14:
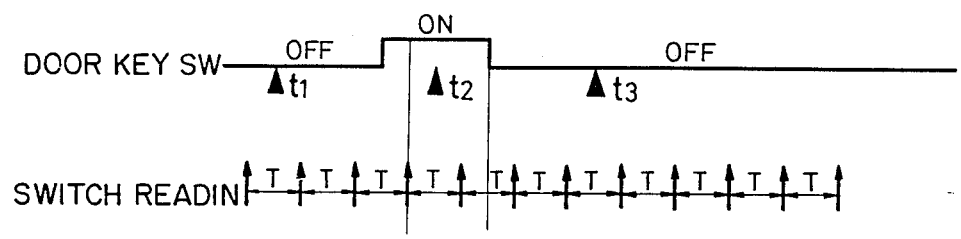
FIG. 14 is a time chart specifically showing the operation of the door key switch illustrated in FIGS. 4 through 7b.

A time chart of FIG. 14 shows the "ON" and "OFF" operations of the door key switch 51. In the time chart of FIG. 14, $t_1$ indicates a point of time turning movement of the key K is started, $t_2$ indicates a point of time turning movement of the key K is completed or finished, and $t_3$ indicates a point of time turning movement of the key K in the reverse direction is completed. The door key switch 51 is turned on only for a short period of time including the point of time $t_2$.

An ignition key cylinder 60 shown in FIG. 8 will next be described. The ignition key cylinder 60 has its basic construction similar to the door key cylinder 40, but has a closure 62 mounted to an innermost end of a tubular body 61. A first ignition key switch 64 of rotary switch type is accommodated in a space between the closure 62 and an innermost end of a rotor 63 accommodated in the body 61. Further, a second ignition key switch 65 of pressure sensitive type is accommodated in an innermost end of an inside space formed in the rotor 63. When the key K is inserted, the second ignition key switch 65 is pushed by the forward end of the key K and is turned on. Thus, this "ON" signal serves as a key-operation detecting signal.

Figure 9:
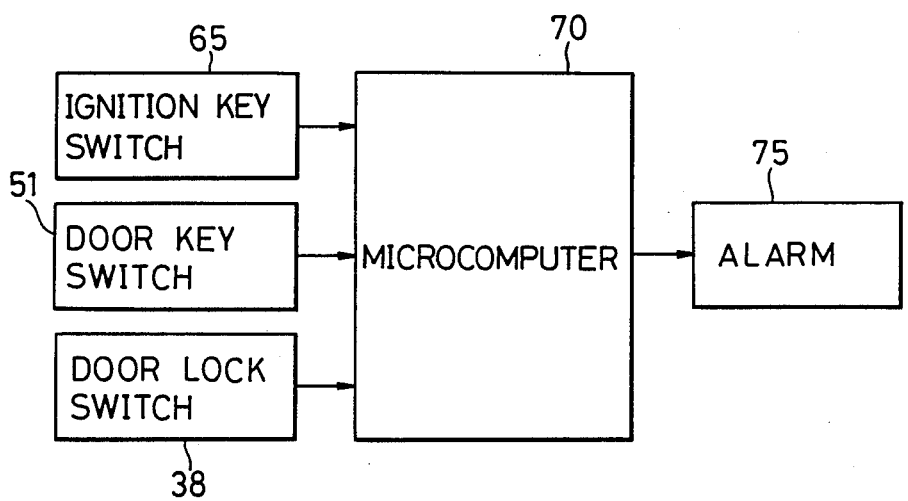
FIG. 9 is a circuit block diagram of the burglarproof system according to the embodiment of the invention.

The burglarproof system comprises a microcomputer 70 as shown in FIG. 9. Inputted to the microcomputer 70 through an interface (not shown) are the "ON" and "OFF" signals from each of the aforesaid door lock switch 38, the door key switch 51 and the ignition key switch 65. On the basis of these "ON" and "OFF" signals, the microcomputer 70 outputs a stealing detection signal. An alarm 75 serving as burglarproof means is designed to be operative in response to the stealing detection signal.

With the arrangement described above, the microcomputer 70 executes the following program.

Figure 10:
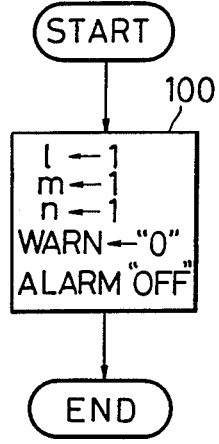

When the power source is turned on, the microcomputer 70 executes the program shown in FIG. 10 in which an initializing is carried out at a step 100. That is, each of delay registers 1, m and n is set to "1", an alarm preparatory flag WARN is set to "0", and outputting of the stealing detection signal is stopped to turn off the alarm 75.

Figure 11:
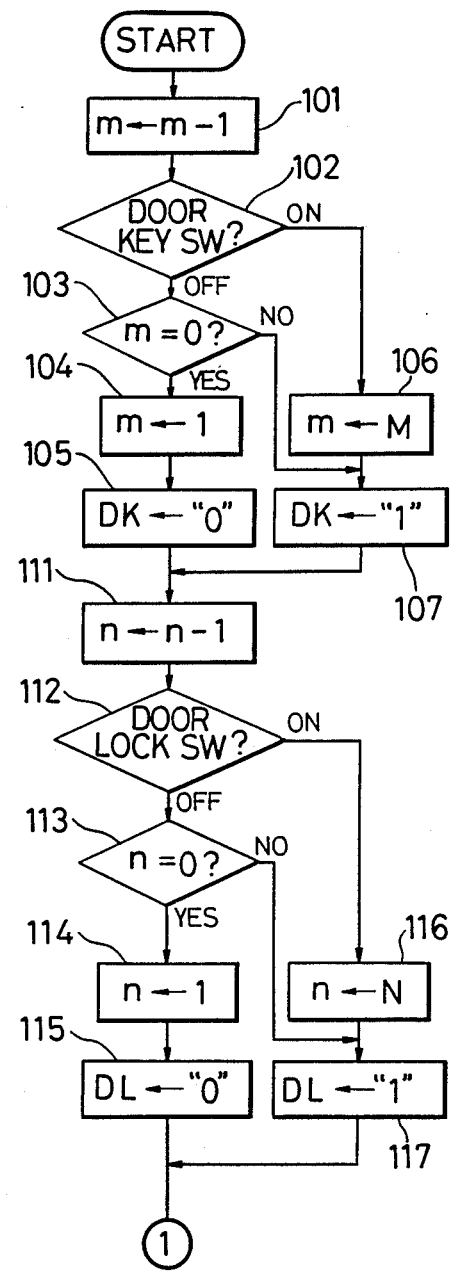
FIG. 11 is a flow chart showing the first half of a program executed at each cycle T.
Figure 12:
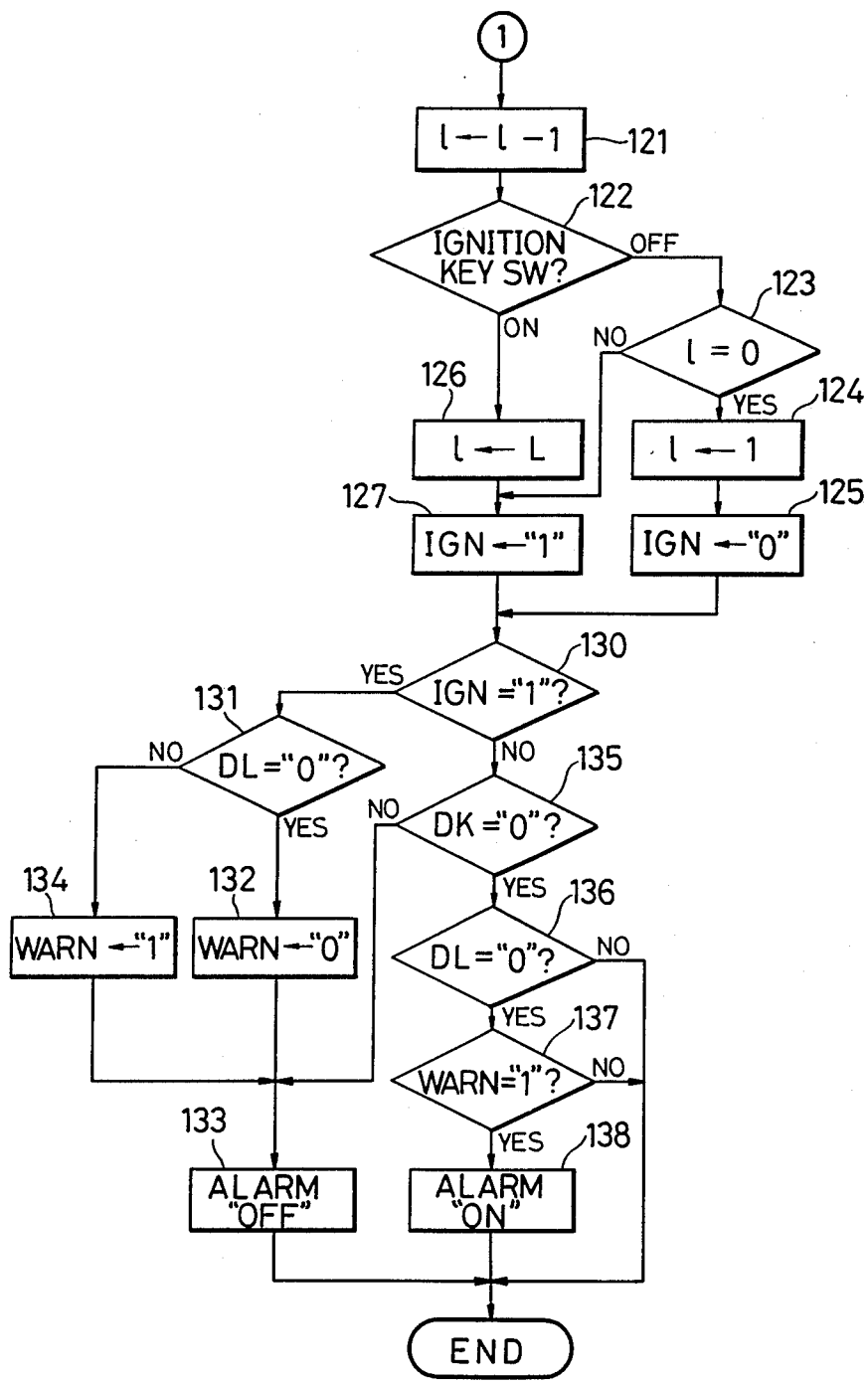
FIG. 12 is a flow chart showing the latter half of the program executed at each cycle T.

A program shown in FIGS. 11 and 12 is then executed at each cycle T. The cycle T is sufficiently shorter than the "ON" time duration of the door key switch 51 as shown in FIG. 14.

At a step 101, 1 is first subtracted from the content of the delay register m corresponding to the door key switch 51. At a subsequent step 102, it is judged whether the door key switch 51 is turned on or off. If the judgment indicates that the door key switch 51 is turned off, it is judged at a subsequent step 103 whether or not the content of the register m is "0". If the judgment at the step 103 indicates "0", the program proceeds to a subsequent step 104 where the content of the register m is set to "1". At a subsequent step 105, a flag DK representative of presence and absence of operation of the key with respect to the door key switch 51 is brought to "0".

When the state in which turning operation of the key is not applied to the door key cylinder 40, that is, the state in which the door key switch 51 is turned off, is maintained, these steps 101 through 105 are repeated at each cycle T.

When the key is inserted into the door key cylinder 40 and is operated so as to be turned, the door key switch 51 is turned on. Thus, in the program executed immediately thereafter, the judgment at the step 102 indicates "ON", and a step 106 is executed. At the step 106, the content of the register m is set to an integer "M" extremely larger than 1. Further, a flag DK is set to "1" at a subsequent step 107.

During the period for which the door key switch 51 is turned on, the steps 101, 102, 106 and 107 are repeated at each cycle T.

As described above, the door key switch is turned off for a short period of time. In the program executed immediately thereafter, 1 is subtracted from the content "M" of the register m at the step 101. The judgment at the subsequent step 102 indicates that the door key switch 51 is turned off, and the step 103 is executed. Since, at the point of time of judgment at the step 103, the content of the register m is in "M−1", the judgment at the step 103 is negative, and the subsequent step 107 is executed. Thus, the flag DK is maintained at "1".

The steps 101, 102, 103 and 107 are repeated at each cycle T till a point of time just before the judgment at the step 103 indicates that the register m is "0". In this manner, even after the door key switch 51 has been turned off, the flag DK is maintained at "1" substantially for a period of time of MT.

This results in the substantial extension, due to a software, of the issuance period of the key-operation detection signal ("ON" signal) from the door key switch 51. In other words, the point of time the start-up of the "OFF" signal from the door key switch 51 is substantially delayed.

After execution of the step 105 or 107, 1 is subtracted at a step 111 from the content of the delay register n corresponding to the door lock switch 38.

At a subsequent step 112, it is judged whether the door lock switch 38 is turned on or off. If the judgment indicates that the door switch 38 is turned off, that is, if the judgment indicated that the locking mechanism 30 is in the unlocked position, it is judged at a subsequent step 113 whether or not the content of the register n is "0". If the judgment indicates "0", the program proceeds to a subsequent step 114 where the content of the register n is set to "1". At a subsequent step 115, the flag DL representative of locking and unlocking is brought to "0". During the period of time for which the locking mechanism 30 is maintained unlocked, these steps 111 through 115 are repeated at each cycle T.

When the locking mechanism 30 is changed to the locked position, the door lock switch 38 is turned on. Accordingly, at the program executed immediately thereafter, the judgment at the step 11 indicates "ON", and a step 116 is executed. At the step 116, the content of the register n is set to an integer "N". Further, the flag DL is set to "1" at a subsequent step 117. During the period of time for which the door lock switch 38 is turned on, the steps 111, 112, 116 and 117 are executed at each cycle T.

If the locking mechanism 30 is again brought to the unlocked position so that the door lock switch 38 is turned off, 1 is subtracted from the content "N" of the register n at the step 111 in the program executed immediately after the door lock switch 38 is turned off. The judgment at the subsequent step 112 indicates that the door lock switch 38 is turned off, and the step 113 is executed. Since, at the point of time of the judgment at the step 113, the content of the register n is in "N−1", the judgment at the step 113 is negative, and the subsequent step 117 is executed. Thus, the flag DL is maintained at "1".

The above steps 111, 112, 113 and 117 are repeated at each cycle T till a point of time just before the judgment at the step 113 indicates that the register n is "0". In this manner, even after the door lock switch 51 has been turned off, the flag DL is maintained at "1" only for a period of time of about NT.

This results in the substantial extension, due to the software, of the issuance period of the locking detection signal ("ON" signal) from the door lock switch 38. In other words, the point of time of the start-up of the unlocking detection signal ("OFF" signal) i substantially delayed.

After completion of the step 115 or the step 117, a step 121 shown in FIG. 12 is executed. At the step 121, 1 is subtracted from the content of the delay register 1 corresponding to the ignition key switch 65.

At a subsequent step 122, it is judged whether the ignition key switch 65 is turned on or off. If the judgment indicates that the ignition key switch 65 is turned off, it is judged at a subsequent step 123 whether or not the content of the register 1 is "0". If the judgment indicates "0", the program proceeds to a subsequent step 124 where the content of the register 1 is set to "1". At a subsequent step 125, a flag IGN representative of insertion of the key into the ignition key cylinder 60 is brought to "0". When the state in which the key is not inserted into the ignition key cylinder 60 is continuing, the steps 121 through 125 are repeated at each cycle T.

When the key is inserted into the ignition key cylinder 60, the ignition key switch 65 is turned on. Accordingly, in the program executed just thereafter, the judgment at the step 122 indicates that the ignition key switch 65 is turned on, and a step 126 is executed. At the step 126, the content of the register 1 is set to an integer "L". Further, the flag IGN is set to "1" at a subsequent step 127. During a period of time for which the ignition key switch 65 is turned on, the steps 121, 122, 126 and 127 are repeated at each cycle T.

When the key is extracted from the ignition key cylinder 60 so that the ignition key switch 65 is turned off, 1 is subtracted from the content "L" of the register 1 at the step 121 in the program executed immediately after the ignition key switch 65 is turned off. The judgment at the subsequent step 122 indicates that the ignition key switch 65 is turned off, and the step 123 is executed. Since, at the point of time of the judgment at the step 123, the content of the register 1 is in "L−1", the judgment at the step 123 is negative, and the subsequent step 127 is executed. Thus, the flag IGN is maintained at "1".

The steps 121, 122, 123 and 127 are repeated till a point of time just before the judgment at the step 123 indicates that the register 1 is "0". In this manner, even after the ignition key switch 65 has been turned off, the flag IGN is maintained at "1" for a period of time of about LT.

This results in the substantial extension, due to the software, of the issuance period of the key-operation detection signal ("ON" signal) from the ignition key switch 65. In other words, the point of time of the start-up of the "OFF" signal representative of extraction of the key from the ignition key switch 65 is substantially delayed.

After execution of the step 125 or the step 127, a step 130 is executed. At the step 130, the flag IGN is judged. If the judgment indicates that the flag IGN is "1", the program proceeds to a step 131 where the flag DL is judged. If the judgment indicates that the flag DL is "0", the flag WARN is brought to "0" at a step 132. The flag WARN is representative of whether or not burglarproof is ready, in other words, whether or not outputting of the stealing detection signal is ready. Further, at a subsequent step 133, outputting of the stealing detection signal is stopped, and the alarm 75 is turned off so that the program is completed.

In the manner described above, at the time of insertion of the key into the ignition key cylinder 60, or within the extended period of time LT after extraction of the key, the burglarproof preparatory condition is released if the locking mechanism 30 is brought to the unlocked position. Moreover, only when the locking mechanism 30 is brought to the locked position within the extended period of time of LT, the burglarproof is ready.

If the judgment at the step 130 indicates that the flag IGN is "0", that is, if the judgment indicates that the key is extracted from the ignition key cylinder and the extended period of time LT has expired, the flag DK is judged at a subsequent step 135. If the judgment indicates "1", the step 133 is executed to complete the program. If the judgment indicates "0", it is judged at a subsequent step 136 whether or not the flag DL is "0". If the judgment indicates that the flag DL is "0", it is judged at a subsequent step 137 whether or not the flag WARN is "1". If the judgment indicates that the flag WARN is "1", the stealing detection signal is outputted at a subsequent step 138 to turn on the alarm 75 thereby sounding an alarm. If the judgment at the step 136 indicates that the flag DL is "1", the steps 137 and 138 are passed and the program is completed. If the judgment at the step 137 indicates that the flag WARN is "0", the step 138 is passed and the program is completed.

Figure 13:
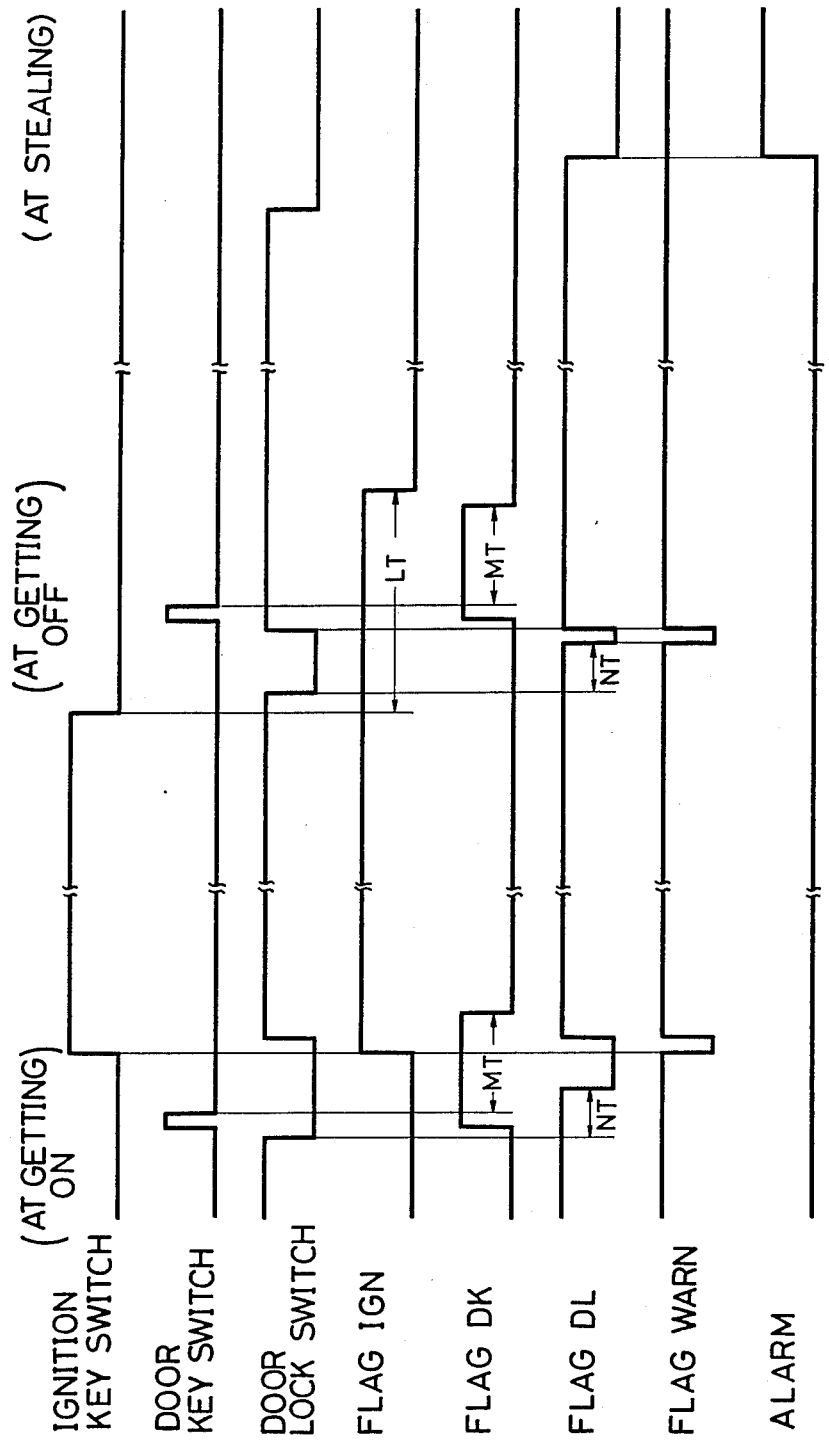
FIG. 13 is a time chart showing the operation of the burglarproof system according to the embodiment of the invention.

The operation in case where the driver possessing the key complies with the regular formality to carry out opening and closing of the door, will next be described specifically with reference to a time chart shown in FIG. 13.

When the regular driver gets on the automotive vehicle, the driver inserts the key into the door key cylinder 40 and operates to turn the key, thereby bringing the locking mechanism 30 to the unlocked position. At this time, the door key switch 51 is temporarily turned on. The door lock switch 38 is turned off just before the door key switch 51 is turned on. The door key switch 38 is maintained "OFF" even after the door key switch 51 has been turned off. The driver sits down on the driver's seat and closes the door, and pushes the lock button 35 to again bring the locking mechanism 30 to the locked position, whereby the door lock switch 38 is returned to the "ON" position.

The microcomputer 70 outputs the stealing detection signal when, fundamentally, the locking mechanism 30 is brought to the unlocked position without turning operation of the key with respect to the door key cylinder 40. On the other hand, the microcomputer 70 does not output the stealing detection signal when turning operation of the key with respect to the door key cylinder 40 causes the locking mechanism 30 to be brought to the unlocking position.

Accordingly in case where unlocking of the locking mechanism 30 is judged directly on the basis of the "OFF" signal from the door lock switch 38 and where turning operation of the key with respect to the door key cylinder 40 is judged directly on the basis of the "ON" signal from the door key switch 51, there is such an anxiety that an alarm is issued before and after the period of time within which the door key switch 51 is turned on, even if the regular driver operates the key to release the locked position of the door.

In the microcomputer 70 according to the embodiment, however, the signal from the door lock switch 38 is replaced by the flag DL. Likewise, the signal from the door key switch 51 is replaced by the flag DK. As a result, the flag DL is brought to "0" during a period of time for which the flag DK is "1". It is thus possible to avoid to make a mistake as being stealing, so that the alarm 75 can be maintained inoperative.

After getting on, the driver inserts the key into the ignition key cylinder 60 and turns the key to stat the engine. At the insertion of the key, the ignition key switch 65 is turned on. Since, during running of the automotive vehicle, the key is maintained inserted, the ignition key switch 65 is maintained "ON".

When the regular driver gets off the automotive vehicle, the key is extracted from the ignition key cylinder 60. The driver merely pulls the lock button 35 up to release the locking mechanism 30 from the locked position, without turning operation of the key with respect to the door key cylinder 60. At this getting off, the information of the flag IGN on the basis of the "ON" signal from the ignition key switch is required to prevent the alarm 75 from being rendered operative. That is, even if the key is extracted so that the ignition key switch 65 is switched from the "ON" position to the "OFF" position, the flag IGN is maintained at "1" for a predetermined period of time. Accordingly, even if the locking mechanism 30 is thereafter brought to the unlocked position, the period of time of the flag DL="0" enters the period of time of the flag IGN="1". Thus, it is possible to avoid to make a mistake as being stealing, so that the alarm 75 is prevented from being sounded.

The flag WARN is brought to "1" during the normal driving operation. However, if the driver releases locking of the door at getting off within the period of time for which the flag IGN is "1", the flag WARN is brought to "0". When the key is operated to be turned with respect to the door key cylinder 40, and so on, to again bring the locking mechanism 30 to the locked position, the flag WARN is again brought to "1" so that a burglarproof is ready.

If a thief unlocks the locking mechanism 30 without insertion of a key into the key cylinder 10 to turn the key after the regular driver has gotten off the automotive vehicle, no "ON" signals from the respective ignition key switch 65 and the door key switch 51 are inputted to the microcomputer 70 so that each of the flags DK and IGN is maintained at "0". In this state, the "OFF" signal is inputted from the door lock switch 38 so that the flag DL is brought to "1". Moreover, since the flag WARN is in the "1" state so that a burglarproof is ready, the judgment indicates stealing to sound the alarm 75. Thus, it is possible to prevent stealing.

Additionally, even if a thief inserts an elongated element into the door key cylinder 40 in place of the key, the door key switch 50 is prevented from being brought to the "ON" position. Thus, it is impossible for the thief to avoid operation of the alarm 75, so that stealing can reliably be prevented.

Figure 15:
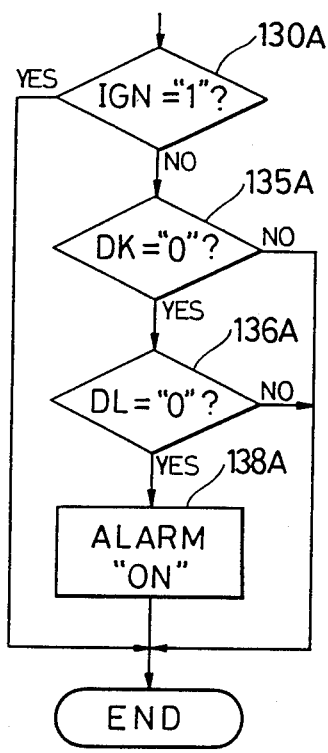
FIG. 15 is a flow chart of another aspect of the program executed by the microcomputer.

By the way, there may often be a case where the driver does not lock the door when he temporarily leaves the automotive vehicle, and so on. In such case, within the period of time for which the flag IGN is "1", the door lock switch 38 is not turned on and the flag DL is maintained at "0", so that the flag WARN is also maintained at "0". Thus, subsequently, even if the flag DL is brought to "0" after an elapse of the period of time for which the flag IGN is maintained at "1", it is possible to avoid to make a mistake as being stealing so that the alarm 75 is prevented from being sounded FIG. 15 shows another aspect of the program executed by the microcomputer 75. In this program, the flag WARN is not employed, and steps 130A, 135A, 136A and 138A are executed in substitution for the steps 130 through 138 shown in FIG. 12. That is, an alarm is sounded at the step 138A when judgment at the step 130A indicates that the flag IGN is "0", when judgment at the step 135A indicates that the flag DK is "0" and when judgment at the step 136A indicates that the flag DL is "0". Thus, when the door is not locked at getting off the automotive vehicle, the alarm 70 is sounded after an elapse of the period of time for which the flag IGN is maintained at "1". By this reason, it is possible to prevent the driver's forgetting of the door locking operation.

It is to be understood that the invention is not limited to the above embodiments, but various modifications can be made to the invention, as will be described below.

In the embodiments described above a limit switch is employed as the door key switch. However, a proximity switch or a photoelectric switch may be utilized for the door key switch.

The acting section provided on the rotor of the door key cylinder may take such a configuration that the acting section extends only in one direction from the axis of the rotor. In this case, the key-operation detection signal is outputted from the door key switch only when the key is operated to be turned in one direction with respect to the door key cylinder so as to change the locking mechanism to the unlocked position. On the other hand, the key-operation detection signal is not outputted when the key is operated to be turned in the other or reversed direction so as to change the locking mechanism to the locked position.

The door lock switch may detect the angular movement position of the engaging member 13 shown in FIG. 2, to thereby detect opening and closing of the door. Further, the door lock switch may detect the angular movement position of the unlatching lever 24 shown in FIG. 3, to thereby detect latching and unlatching. Opening and unlatching of the door is carried out on the assumption that the locking mechanism is unlocked. Accordingly, also in these cases, the door lock switch substantially detects locking and unlocking of the locking mechanism.

The ignition key switch may output the key-operation detection signal when the key is turned through a predetermined angular extent, in response not to insertion of the key into the ignition key cylinder. Further, a manual switch arranged at an inconspicuous location within the vehicle compartment may be used instead of the ignition key switch.

The delay means and the stealing detection means may be formed by usual hardwares in place of the microcomputer.

In the course of releasing of locking of the door by turning operation of the key, it is unnecessary to delay the unlocking detection signal, if the unlocking signal is outputted from the door lock switch after the key-operation detection signal has been outputted from the door key switch.

The burglarproof means may be an element for preventing the start-up of the engine, such as a circuit for prohibiting operation of the starter, and so on. Alternatively, a circuit may be employed, for sounding the horn originally provided on the automotive vehicle, in response to the stealing detection signal from the stealing detection means

What is claimed is:

1. A burglarproof system for an automotive vehicle, comprising:
   (a) latching means for maintaining a door of the automotive vehicle closed with respect to a body of the automotive vehicle;
   (b) unlatching operating means for bringing said latching means to an unlatched state;

(c) locking means movable between a locked position where said locking means prohibits transmission of a force from said unlatching operating means to said latching means to maintain the door closed and an unlocked position where said locking means permits the force to be transmitted from said unlatching means to said latching means;

(d) a door key cylinder arranged at the door, said door key cylinder including:
 (i) a cylindrical body;
 (ii) a rotor accommodated in said cylindrical body, said rotor being operatively connected to said locking means and angularly movable about its own axis between a first angular movement position bringing said locking means to said locked position and a second angular movement position bringing said locking means to said unlocked position;
 (iii) tumbler means accommodated in said cylindrical body and movable between a first position where said tumbler means prohibits angular movement of said rotor relative to said cylindrical body and a second position where said tumbler means permits angular movement of said rotor relative to said cylindrical body, said tumbler means being moved from said first position to said second position when the key is inserted into said rotor; and
 (iv) an acting section provided at said rotor and extending radially from an axis of said rotor, (e) a door key switch arranged in the vicinity of said door key cylinder, said door key switch detecting said acting section of said rotor to output a key-operation detection signal when said rotor of said door key cylinder is angularly moved about its own axis toward the second angular movement position by turning operation of said key;

(f) a door lock switch for detecting in which one of said locked position and said unlocked position said locking means is;

(g) stealing detection means for outputting a stealing detection signal when said stealing detection means does not receive the key-operation detection signal from said door key switch, but receives a lock-releasing detection signal from said door lock switch; and (h) burglarproof means for executing operation for a burglarproof in response to said stealing detection signal from said stealing detection means.

2. A burglarproof system according to claim 1, wherein said door key switch is mounted to said cylindrical body of said door key cylinder through attaching means, said door key switch and said door key cylinder cooperating with each other to form a united assembly.

3. A burglarproof system according to claim 1, further comprising extension means for substantially extending an issuance period of the key-operation detection signal from said door key switch to supply the extended key-operation detection signal to said stealing detection means.

4. A burglarproof system according to claim 1, further comprising extension means for substantially extending an issuance period of the locking detection signal from said door lock switch to supply the extended locking detection signal to said stealing detection means.

5. A burglarproof system according to claim 1, further comprising an ignition key switch for detecting operation of the key with respect to an ignition key cylinder of the automotive vehicle, to output a key-operation detection signal, said stealing detection means being prohibited from outputting the stealing detection signal in a state in which said stealing detection means receives the key-operation detection signal from said ignition key switch.

6. A burglarproof system according to claim 5, further comprising extension means for substantially extending an issuance period of the key-operation detecting signal from said ignition key switch, to supply the extended key-operation detection signal to said stealing detection means.

7. A burglarproof system according to claim 6, further comprising stealing detection preparatory means for commanding said stealing detection means to prepare outputting of the stealing detection signal, when said stealing detection preparatory means receives a door lock detection signal during a period of time for which said stealing detection preparatory means receives the key-operation detection signal from said ignition key switch through said extension means wherein said stealing detection means outputs the stealing detection signal when said stealing detection means does not receive the key-operation detection signal from said door key switch, but receives the unlocking detection signal from said door lock switch in the output preparatory state.

8. A burglarproof system according to claim 7, wherein said stealing detection preparatory means commands said stealing detection means to release the preparation of outputting of the stealing detection signal when said stealing detection preparatory means receives the unlocking detection signal during a period of time for which said stealing detection preparatory means receives the key operation detection means from said ignition key switch through said extension means.

* * * * *